(12) United States Patent
Ennis

(10) Patent No.: US 6,451,378 B1
(45) Date of Patent: Sep. 17, 2002

(54) COATING EPDM RUBBER MEMBRANES

(75) Inventor: Thomas James Ennis, Glenmoore, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/659,855

(22) Filed: Sep. 11, 2000

Related U.S. Application Data

(60) Provisional application No. 60/155,719, filed on Sep. 23, 1999.

(51) Int. Cl.[7] .............................. B05D 7/02; B05D 3/00
(52) U.S. Cl. ........................ 427/302; 427/299; 427/301; 427/322
(58) Field of Search ................................. 427/299, 301, 427/322, 302

(56) References Cited

U.S. PATENT DOCUMENTS

| | | | | |
|---|---|---|---|---|
| 3,882,567 A | * | 5/1975 | Herzog | ................... 15/250.36 |
| 4,065,409 A | * | 12/1977 | Flanagan | ..................... 252/528 |
| 4,306,994 A | * | 12/1981 | Ellslager | ..................... 252/382 |
| 4,539,134 A | * | 9/1985 | Martin et al. | ................. 252/156 |
| 4,571,415 A | * | 2/1986 | Jordan, Jr. | .................... 524/395 |
| 4,847,004 A | * | 7/1989 | McLeod | ..................... 252/527 |
| 5,204,148 A | * | 4/1993 | Alexander et al. | ............ 428/40 |
| 5,488,752 A | * | 2/1996 | Randolph | ................. 15/250.06 |
| 6,197,051 B1 | * | 3/2001 | Zhong | ....................... 427/2.25 |

FOREIGN PATENT DOCUMENTS

| | | |
|---|---|---|
| EP | 0924 278 A | 6/1999 |
| GB | 1474 389 A | 5/1977 |
| JP | 11207875 | 3/1999 |

* cited by examiner

*Primary Examiner*—Shrive P. Beck
*Assistant Examiner*—Kirsten A. Crockford
(74) *Attorney, Agent, or Firm*—Karl Stauss

(57) ABSTRACT

Adhesion between a coating and an EPDM rubber membrane may be improved by pre-treating the surface of the EPDM rubber membrane with an aqueous detergent composition having a pH above 8 and comprising from 1 to 10% by weight phosphate and from 1 to 10% by weight silicate, before application of the mastic.

6 Claims, No Drawings

COATING EPDM RUBBER MEMBRANES

CROSS REFERENCE TO RELATED PATENT APPLICATIONS

This patent application claims the benefit of the earlier filing date of the prior filed co-pending provisional application serial No. 60/155,719 filed on Sep. 23, 1999 under 37 CFR 1.78(a)(4).

This invention is concerned with coating EPDM rubber membranes. More particularly, though not exclusively, this invention is concerned with a method for improving the adhesion of a coating to an EPDM rubber membrane.

A large proportion of the roofing market utilizes asphalt-based products, for example, modified bituminous rolls, as a base membrane or roofing membrane which is then topcoated with conventional roof mastics to improve durability (asphalt degradation), provide energy savings (white coating vs. black asphalt), reduce the fire rating and improve aesthetics. Such coatings are frequently referred to as "roof mastics" although "coatings" as used herein includes any such thick coatings applied to a substantially horizontal surface such as, for example, a roof deck, to a substantially vertical surface such as, for example, a wall, or to other membrane surfaces.

EPDM (ethylene propylene diene monomer) rubber is also utilized in the roofing market as a roofing membrane. However, unlike the bituminous roofing membranes, EPDM roofing membranes have hitherto been difficult to topcoat with a mastic, due to poor adhesion between the mastic and EPDM rubber, particularly on flat or low slope roofs where ponding of rain water occurs. Even when the membrane surface has been cleaned and scrubbed with water or with a mild detergent and then rinsed with water immediately before application of the mastic, there is little or no measurable improvement in adhesion. Consequently, roofs covered with EPDM rubber tend not to be topcoated with a mastic and, therefore, fail to benefit from the improvements which a mastic topcoat can provide.

A coating system which displays good adhesion and superior resistance to blistering, especially when exposed to ponded water is disclosed in U.S. Pat. No. 5,059,456. This system relies upon the use of a water-based tiecoat between the membrane and the coating. The tiecoat consists of a water-insoluble latex polymer and multivalent metal ion, wherein the latex polymer comprises units such as would result from preparation from a monomer mixture comprising at least 20 weight %, based on the weight of the monomer mixture, of at least one hydrophobic monomer selected from the group consisting of ($C_4$–$C_{20}$)-alkyl methacrylates and ($C_8$–$C_{20}$)-alkyl acrylates, and from 3.0 weight % to 7.5 weight % of methacrylic acid, based on the weight of the monomer mixture, and where the latex polymer has a glass transition temperature of from –20° C. to 5° C., and where the molar ratio of the multivalent metal ion to the methacrylic acid in the latex polymer is from about 1:1 to about 0.375:1. The tiecoat is applied to a membrane before subsequent application of a coating. Though this system offers properties of adhesion and resistance to blistering which are superior to conventional mastic systems on bituminous membranes, there is no disclosure of coating EPDM rubber membranes.

It is an object of the present invention to provide a coating system which offers improved adhesion on EPDM rubber membranes, such as roofing membranes. Moreover, it is preferred if the above improvements in the quality of a coating system can be achieved with a system which does not essentially rely upon the use of a tiecoat between the membrane and mastic composition.

In accordance with the present invention, there is provided a method for improving the adhesion between a coating and an EPDM rubber membrane, which method comprises:

(A) treating a surface of an EPDM rubber membrane with an aqueous detergent composition; then (B) rinsing said surface of said EPDM rubber membrane with water to remove said detergent composition; and then (C) applying a coating composition to said rinsed surface of said EPDM rubber membrane, wherein said aqueous detergent composition has a pH above 8 and comprises from 1 to 10% by weight phosphate and from 1 to 10% by weight silicate.

Surprisingly, it has been found that by pre-treating an EPDM rubber membrane with said detergent composition before applying a conventional coating composition, a synergistic improvement in adhesion between the membrane and coating can be achieved. The surprising advantages of the present invention may be measured for both coatings applied on newly laid membranes and coatings applied on old membranes which have been laid on roofs for an extended period of time.

Preferably, the membrane for application of the invention is an EPDM rubber membrane sold for roofing applications. Preferably, the roofing membrane lies over a flat or low slope roof.

The coating composition will preferably comprise a water-insoluble latex polymer binder, having a glass transition temperature of from –45° C. to 5° C. (as measured by the Fox equation), which is preferably acrylic or styrene/acrylic. In addition to the latex polymer, the composition will comprise at least one or more of the following components: pigments, extenders, dispersants, surfactants, coalescents, wetting agents, thickeners, rheology modifiers, drying retarders, plasticizers, biocides, mildewicides, defoamers, colorants, waxes, dirt pick-up retarders, adhesion promoters, zinc oxide and solid silica. The coating composition is preferably a mastic coating composition. The binder used in the mastic coating composition is preferably a commercially available binder useful for mastic applications, such as a binder selected from the group including Rhoplex EC-1791, Rhoplex 2019R and Rhoplex EC-2885 available from Rohm and Haas Company; Acronal NX 3550 available from BASF AG and DA26NA available from Dow. More preferably, the mastic binder is selected from the group including Rhoplex EC-1791, Rhoplex EC-2885 and Acronal NX 3550. Rhoplex EC-1791 is the most preferred mastic binder composition.

The aqueous detergent composition comprises from 1 to 10%, preferably 2 to 8%, more preferably 3 to 6%, by weight of said composition of a mono- or poly-phosphate or a mixture of such phosphates, preferably selected from the group consisting of trisodium phosphate, sodium tripolyphosphate and tripotassium phosphate. Trisodium phosphate is the most preferred. The aqueous detergent composition comprises from 1 to 10%, preferably 2 to 8%, more preferably 3 to 6%, by weight of said composition of a meta-, ortho- or para-silicate or a mixture of such silicates, preferably selected from the group consisting of sodium metasilicate and potassium metasilicate. Sodium metasilicate is the most preferred. The phosphates and silicates useful in the detergent composition are those commonly used in conventional detergent compositions, such as in dish-washing and clothes-washing detergents.

The aqueous detergent composition may also comprise other components typically found in aqueous detergent composition. For example, the composition may comprise up to 5%, preferably up to 2%, by weight of at least one compound selected from the group consisting of octylphenoxy polyethoxy ethanol, octyphenoxy polyethoxy ethylphosphate, polyethylene glycol and phosphoric acid.

The aqueous detergent composition has a pH of above 8, preferably a pH from 9 to 14, and most preferably a pH from 12 to 14.

The best results are obtained from the present invention when all the surface of the EPDM rubber membrane is contacted with the detergent composition. The detergent composition may be spread over the surface with the aid of a stiff brush. The detergent composition should preferably be left to stand in contact with the surface of the membrane for a short period of time. For example, though an improvement in adhesion of a coating may be measured when the detergent composition is left to treat the surface for less than 30 seconds, the best results are achieved when the detergent composition is allowed to contact the surface for at least 30 seconds. A contact time significantly over 30 seconds will tend not to lead to any significant further improvements in adhesion over a contact time of 30 seconds, though in practice contact times may be 10 to 30 minutes depending on the size of the roof and the speed of the operator. Permitting the detergent to dry on the surface before rinsing may not be detrimental to the method of the present invention, provided the surface is rinsed well afterwards to remove the detergent.

The best results are obtained from the present invention when rinsing of the surface of the EPDM rubber membrane with water removes substantially all of the detergent composition. High efficiency rinsing may involve the use of a stiff brush and/or the use of a high pressure hose. Typically, the high pressure hose will release rinse water at about 211 Kg cm$^{-2}$ (3000 psi).

The following Examples, including Comparative Examples, are given solely for the purpose of illustrating the invention and are in no way to be considered limiting.

Tests

In the examples, the coatings are subjected to dry and wet adhesion tests. These are performed in accordance with ASTM Protocol D903.

EXAMPLE 1

Preparation of Aqueous Detergent Compositions

Aqueous detergent compositions Nos. 1–6, with the formulations indicated in Table 1, were prepared by mixing the components in the prescribed amounts in a pail. The compositions were mixed in the pail until all components appeared to have dissolved. Aqueous detergent composition No 6 is in accordance with the invention, compositions Nos. 1–5 are comparatives. Each detergent composition had a pH above 13.

EXAMPLE 2

Testing the Aqueous Detergent Compositions

Sheets of two commercially available EPDM rubber roofing membranes were laid flat on a surface. The upper surface of each sheet was then washed with tap water using a high pressure hose. After washing with water, 30 cm$^2$ sections of each sheet was then treated with detergent compositions Nos. 1–6 by spreading 100 cm$^3$ of detergent composition over the surface to be treated and brushing the composition over the surface and allow to stand for 30 to 300 seconds. Then the detergent composition was washed away with tap water from a high pressure hose (211 Kg cm$^{-2}$ (3000 psi)).

Each of the treated sections and a section not treated with detergent on each membrane was then coated in a conventional manner with, a general roofing mastic having the following composition:

| | INGREDIENTS: | LBS/100 GAL |
|---|---|---|
| GRIND: | | |
| A. | Water | 152.5 |
| | Tamol ® 850 | 4.8 |
| | KTPP | 1.4 |
| | Nopco NXZ | 1.9 |
| B. | Duramite | 422.2 |
| | Ti-Pure R-960 | 70.4 |
| | Kadox 915 | 46.9 |
| LETDOWN: | | |
| C. | Rhoplex ® EC-1791 (55%) | 470.6 |
| | Nopco NXZ | 1.9 |
| D. | Texanol | 7.0 |
| | Skane ® M-8 | 2.1 |
| E. | NH$_4$OH (28%) | 1.0 |
| F. | Propylene Glycol | 24.4 |
| | Natrosol 250 MXR | 4.2 |
| PHYSICAL CONSTANTS: | | |
| Solids Content, % | | 66.9 |
| by Weight | | 50.8 |
| by Volume | | 43.0 |
| PVC | | 12.1 |
| Density, lb/gal | | 95.0 |
| Viscosity, KU | | 95.0 |
| pH | | 8.6 |

Tamol 850 is a surfactant available from Rohm and Haas Company

KTPP is potassium tripolyphosphate

Nopco NXZ is available from Henkel Corp

Duramite is available from ECC America, Inc

Ti-Pure R-960 is titanium dioxide available from E I DuPont de Nemours., Inc

Kadox is available from Zinc Corp. of America

Texanol is available from Eastman Kodak

Skane M-8 is a mildewcide available from Rohm and Haas Company

Natrosol 250 MXR is available from Aqualon, Inc.

The wet and dry adhesion properties of the mastic coating on each relevant section of the membranes were then measured. The results are given in Table 1.

TABLE 1

Adhesion(N/m) of selected Treatments New EPDM

| Treatment | Water | 1 | 2 | 3 | 4 | 5 | 6 |
|---|---|---|---|---|---|---|---|
| Detergent Components (parts by weight) | | | | | | | |
| Sodium Metasilicate | | 5 | | | 5 | | 5 |
| Soap | | | | 2.4 | 2.4 | 2.4 | 2.4 |
| Trisodium phosphate | | | 5 | | | 5 | 5 |
| Water | | 87.8 | 87.8 | 87.8 | 87.8 | 87.8 | 87.8 |
| Peel Adhesion Roofing membrane 1 | | | | | | | |
| Dry* | 88 | 140 | 105 | 88 | 88 | 88 | 210 |
| Wet** | 140 | 280 | 280 | 123 | 123 | 175 | 350 |
| Roofing membrane 2 | | | | | | | |
| Dry* | 105 | 228 | 140 | 88 | 123 | 88 | 350 |
| Wet** | 158 | 280 | 245 | 193 | 228 | 175 | 333 |

*Dry samples are conditioned for 14 days at 23° C. and 50% RH before testing
**Wet samples are conditioned for 14 days dry at 23° C./50% RH then soak in tap water for 7 days before testing Soap=127 parts octylphenoxypolyethoxyethanol 58.5 parts octylphenoxypolyethoxyethylphosphate 3.9 parts polyethylene glycol 11.7 parts phosphoric acid 18.9 parts water As shown in Table 1, aqueous detergent composition No 6 when used in the method of the present invention demonstrates significant increase in measured wet and dry adhesion for the coating on EPDM rubber membrane.

EXAMPLE 3

Testing Different Coating Compositions on New EPDM Rubber Membranes

The dry and wet adhesion properties of several different commercially available roofing mastic compositions were evaluated on a newly laid EPDM rubber membrane treated, as described above, with aqueous detergent composition No 6. The results are shown in Table 2.

TABLE 2

Adhesion(N/m)to New EPDM
In Roof Coating Formulation ARM-91-1

| Mastic binder | Rhoplex EC-1791 | Acronel NX 3550 | DA26NA | Rhoplex EC-2885 | Rhoplex 2019R |
|---|---|---|---|---|---|
| Water Rinse Only | | | | | |
| Dry* | 88 | 70 | 53 | 35 | 53 |
| Wet** | 140 | 35 | 123 | 18 | 35 |
| No 6 Detergent/ Water Rinse | | | | | |
| Dry* | 298 | 105 | 70 | 980 | 840 |
| Wet** | 630 | 105 | 140 | 437 | 175 |

*Dry samples are conditioned for 14 days at 23 degree C. and 50% RH before testing
**Wet samples are conditioned for 14 days at 23 degree C./50% RH then soak in tap water for 7 days before testing It is shown in Table 2 that improvement in adhesion between a coating and the EPDM membrane is improved through the pre-treatment of the membrane with detergent No 6.

What is claimed is:

1. A method for improving the adhesion between a coating and an EPDM rubber roofing membrane, which method comprises:

(A) treating a surface of an EPDM rubber roofing membrane with an aqueous detergent composition; then
   (B) rinsing said surface of said EPDM rubber roofing membrane with water to remove sad detergent composition; and then
   (C) applying a coating composition to said rinsed surface of said EPDM rubber roofing membrane, wherein said aqueous detergent composition has a pH greater than 8 and comprises from 1 to 10% by weight phosphate and from 1 to 10% by weight metasilicate.

2. A method as claimed in claim 1 wherein the phosphate is a monophosphate.

3. A method as claimed in claim 2, wherein the monophosphate is trisodium phosphate.

4. A method as claimed in claim 1, wherein the metasilicate is sodium metasilicate.

5. A method as claimed in claim 1, wherein the pH of the detergent composition is in the range 9 to 14.

6. A method as claimed in claim 1, wherein the coating is a mastic coating.

* * * * *